(12) United States Patent
Simoncic et al.

(10) Patent No.: US 9,159,218 B2
(45) Date of Patent: Oct. 13, 2015

(54) INITIATION OF CARBON MONOXIDE AND/OR SMOKE DETECTOR ALARM TEST USING IMAGE RECOGNITION AND/OR FACIAL GESTURING

(71) Applicant: Microchip Technology Incorporated, Chandler, AZ (US)

(72) Inventors: Richard Simoncic, Paradise Valley, AZ (US); Arthur B. Eck, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 36 days.

(21) Appl. No.: 14/029,757

(22) Filed: Sep. 17, 2013

(65) Prior Publication Data

US 2015/0077242 A1 Mar. 19, 2015

(51) Int. Cl.
| | |
|---|---|
| G08B 29/00 | (2006.01) |
| G08B 1/08 | (2006.01) |
| G08B 17/10 | (2006.01) |
| G08B 23/00 | (2006.01) |
| G06K 9/00 | (2006.01) |
| G08B 29/14 | (2006.01) |
| G08B 29/12 | (2006.01) |
| G08B 17/00 | (2006.01) |
| G08B 17/11 | (2006.01) |

(52) U.S. Cl.
CPC .......... G08B 29/145 (2013.01); G06K 9/00302 (2013.01); G08B 17/10 (2013.01); G08B 29/12 (2013.01); G08B 17/00 (2013.01); G08B 17/11 (2013.01)

(58) Field of Classification Search
None
See application file for complete search history.

(56) References Cited

U.S. PATENT DOCUMENTS

| | | | | |
|---|---|---|---|---|
| 4,827,244 | A * | 5/1989 | Bellavia et al. | 340/514 |
| 5,424,587 | A | 6/1995 | Federowicz | 307/140 |
| 5,596,648 | A | 1/1997 | Fast | 381/77 |
| 5,745,040 | A | 4/1998 | Loughridge | 340/628 |
| 6,437,698 | B1 | 8/2002 | Byrne et al. | 340/630 |
| 6,611,204 | B2 * | 8/2003 | Schmurr | 340/538 |
| 6,741,174 | B2 | 5/2004 | Rhoades et al. | 340/540 |

(Continued)

FOREIGN PATENT DOCUMENTS

| | | | | |
|---|---|---|---|---|
| CN | 203015204 U | 6/2013 | | H05B 37/02 |
| EP | 0034562 A2 | 8/1981 | | G08B 17/00 |

(Continued)

OTHER PUBLICATIONS

International Search Report and Written Opinion, Application No. PCT/US2014/055748, 13 pages, Jan. 7, 2015.

(Continued)

*Primary Examiner* — Ariel Balaoing
*Assistant Examiner* — Mohamed Barakat
(74) *Attorney, Agent, or Firm* — Slayden Grubert Beard PLLC

(57) ABSTRACT

An apparatus for smoke detection having an image sensor may be tested using image or pattern recognition, or facial gesturing without having to climb a ladder or chair to initiate the test, or be uncomfortably close to the smoke detector apparatus during initiation of the testing thereof. Carbon monoxide (CO) and/or carbon dioxide ($CO_2$) monitoring and alarm may also be incorporated into this apparatus. Other control functions may also be initiated with image or pattern recognition, or facial gesturing such as audio features associated with the smoke detector apparatus such as networked speakers for distribution of music, intercom, telephone, and/or doorbell annunciation.

23 Claims, 2 Drawing Sheets

(56) References Cited

U.S. PATENT DOCUMENTS

| | | | |
|---|---|---|---|
| 6,930,596 B2 | 8/2005 | Kulesz et al. | 340/506 |
| 7,042,352 B2 | 5/2006 | Kates | 340/539.1 |
| 7,295,687 B2 | 11/2007 | Kee et al. | 382/118 |
| 7,319,402 B1 | 1/2008 | Sudderth | 340/628 |
| 7,512,247 B1 | 3/2009 | Odinak et al. | 381/312 |
| 7,576,659 B2* | 8/2009 | Lax | 340/628 |
| 8,457,367 B1* | 6/2013 | Sipe et al. | 382/118 |
| 8,466,800 B1* | 6/2013 | Billman | 340/636.1 |
| 2001/0038336 A1 | 11/2001 | Acevedo | 340/628 |
| 2003/0179096 A1 | 9/2003 | Hanan | 340/628 |
| 2003/0229500 A1* | 12/2003 | Morris | 704/275 |
| 2004/0110545 A1 | 6/2004 | Kim | 455/575.1 |
| 2005/0040943 A1 | 2/2005 | Winick | 340/539.1 |
| 2005/0156731 A1 | 7/2005 | Chapman, Jr. et al. | 340/521 |
| 2005/0253709 A1* | 11/2005 | Baker | 340/539.26 |
| 2005/0280526 A1 | 12/2005 | Kalafarski | 340/510 |
| 2006/0082452 A1 | 4/2006 | Kaiser et al. | 340/506 |
| 2007/0194906 A1* | 8/2007 | Sink | 340/506 |
| 2008/0122929 A1 | 5/2008 | Chukwu | 348/143 |
| 2010/0020166 A1 | 1/2010 | Levine et al. | 348/82 |
| 2010/0102957 A1 | 4/2010 | Rutledge | 340/539.14 |
| 2010/0238036 A1* | 9/2010 | Holcombe | 340/629 |
| 2011/0043367 A1 | 2/2011 | Becker et al. | 340/577 |
| 2012/0210785 A1 | 8/2012 | Casey | 73/431 |
| 2013/0002687 A1 | 1/2013 | Conti | 345/501 |
| 2013/0117384 A1 | 5/2013 | Martch | 709/206 |
| 2013/0141587 A1 | 6/2013 | Petricoin, Jr. | 348/156 |
| 2013/0147599 A1 | 6/2013 | Becker et al. | 340/5.61 |
| 2013/0169430 A1 | 7/2013 | Shook | 340/539.1 |
| 2014/0256260 A1 | 9/2014 | Ueda et al. | 455/41.2 |
| 2014/0324232 A1 | 10/2014 | Modi et al. | 700/278 |

FOREIGN PATENT DOCUMENTS

| | | | |
|---|---|---|---|
| GB | 2422506 A | 7/2006 | G08B 13/196 |
| GB | 2471860 A | 1/2011 | G08B 17/00 |
| WO | 02/071361 A1 | 9/2002 | G08B 17/10 |

OTHER PUBLICATIONS

International Search Report and Written Opinion, Application No. PCT/US2014/055759, 16 pages, May 27, 2015.

U.S. Non-Final Office Action, U.S. Appl. No. 14/029,770, 20 pages, Aug. 11, 2015.

* cited by examiner

INITIATION OF CARBON MONOXIDE AND/OR SMOKE DETECTOR ALARM TEST USING IMAGE RECOGNITION AND/OR FACIAL GESTURING

TECHNICAL FIELD

The present disclosure relates to smoke and carbon monoxide/dioxide detectors, and, more particularly, to initiation of alarm testing of the smoke and carbon monoxide/dioxide detectors.

BACKGROUND

Many municipalities, states and countries may require smoke alarms through building codes, e.g., 2012 International Residential Code (IRC), in each sleeping room, outside each separate sleeping area in the immediate vicinity of the bedrooms, and on each additional story of the dwelling, including basements (IRC 314.3). Smoke detectors may be powered from the AC line and may have a battery backup. A single backup battery may be provided for a plurality of smoke detectors, e.g., in industrial installations where the one main battery backup may be used instead of a backup battery at each smoke alarm.

Where more than one smoke alarm is required to be installed within an individual dwelling unit in accordance with IRC Section R314.3, the smoke alarm devices shall be interconnected in such a manner that the actuation of one smoke alarm will activate all of the smoke alarms in the individual unit (IRC 314.5). The National Fire Protection Association (NFPA) recommends that smoke alarms be tested one a month. Even better to test once a week. However, testing of smoke alarms requires activating a test button on the smoke alarm device that, generally, is mounted on a ceiling of a room and well out of reach of a person unless a ladder or chair is used by the person to reach the smoke alarm test button. Even if the smoke alarm test button is easily reachable, the audible alarm signal is uncomfortable to the ears at close range.

SUMMARY

Therefore, what is needed is a way to conveniently test smoke alarms without having to climb a ladder, chair, table, etc., or being too close to the smoke alarm during audible alarm testing thereof.

According to an embodiment, an apparatus for detecting smoke and having facial gesturing recognition capabilities may comprise: a logic device; a smoke sensor coupled to the logic device; an image sensor coupled to the logic device; a communications interface coupled to the logic device; an audible alarm generator coupled to the logic device; and a power supply coupled to and powering the logic device, communications interface and the audible alarm generator; wherein when the smoke sensor detects smoke the logic device generates at least one smoke alarm tone through the audible alarm generator, and a smoke alarm signal through the communications interface; and wherein recognition of a facial gesture initiates smoke alarm testing.

According to a further embodiment, the facial gesture may be selected from the group consisting of blinking eyes, opening and closing a mouth, wiggling ears, moving face back and forth, smiling, frowning, and having one eye open and the other eye closed. According to a further embodiment, the audible alarm generator may comprise a speaker coupled to an audio amplifier that may be coupled to the logic device.

According to a further embodiment, the communications interface may be coupled to a wired communications bus. According to a further embodiment, the wired communications bus may be an Ethernet local area network. According to a further embodiment, the communications interface may be a wireless interface coupled to a radio frequency antenna. According to a further embodiment, the communications interface may be adapted to communicate with a wireless local area network (WLAN). According to a further embodiment, the smoke sensor may be an ionization chamber smoke sensor. According to a further embodiment, the smoke sensor may be an optical smoke sensor.

According to a further embodiment, a microphone and an audio interface may be coupled to the logic device and provide an audio input thereto. According to a further embodiment, a carbon monoxide sensor may be coupled to the logic device. According to a further embodiment, a carbon dioxide sensor may be coupled to the logic device. According to a further embodiment, an image acquisition indicator that indicates when an image of a face may be present in the image sensor. According to a further embodiment, the logic device may comprise a microcontroller. According to a further embodiment, the logic device may be selected from the group consisting of a microprocessor, a digital signal processor (DSP), an application specific integrated circuit (ASIC), and a field programmable gate array (FPGA).

According to another embodiment, an apparatus for detecting smoke and having image recognition capabilities may comprise: a logic device; a smoke sensor coupled to the logic device; an image sensor coupled to the logic device; a communications interface coupled to the logic device; an audible alarm generator coupled to the logic device; and a power supply coupled to and powering the logic device, communications interface and the audible alarm generator; wherein when the smoke sensor detects smoke the logic device generates at least one smoke alarm tone through the audible alarm generator, and a smoke alarm signal through the communications interface; and wherein recognition of an image initiates smoke alarm testing.

According to a further embodiment, the image may be a pattern on a substrate. According to a further embodiment, the pattern may be a universal product code (UPC). According to a further embodiment, the pattern may be an Aztec code. According to a further embodiment, the smoke sensor may be an ionization chamber smoke sensor. According to a further embodiment, the smoke sensor may be an optical smoke sensor. According to a further embodiment, a carbon monoxide sensor may be coupled to the logic device. According to a further embodiment, an image acquisition indicator may be coupled to the logic device and indicate when an image may be present in the image sensor. According to a further embodiment, the logic device may comprise a microcontroller. According to a further embodiment, the logic device may be selected from the group consisting of a microprocessor, a digital signal processor (DSP), an application specific integrated circuit (ASIC), and a field programmable gate array (FPGA).

BRIEF DESCRIPTION OF THE DRAWINGS

A more complete understanding of the present disclosure may be acquired by referring to the following description taken in conjunction with the accompanying drawings wherein.

Figure 1:
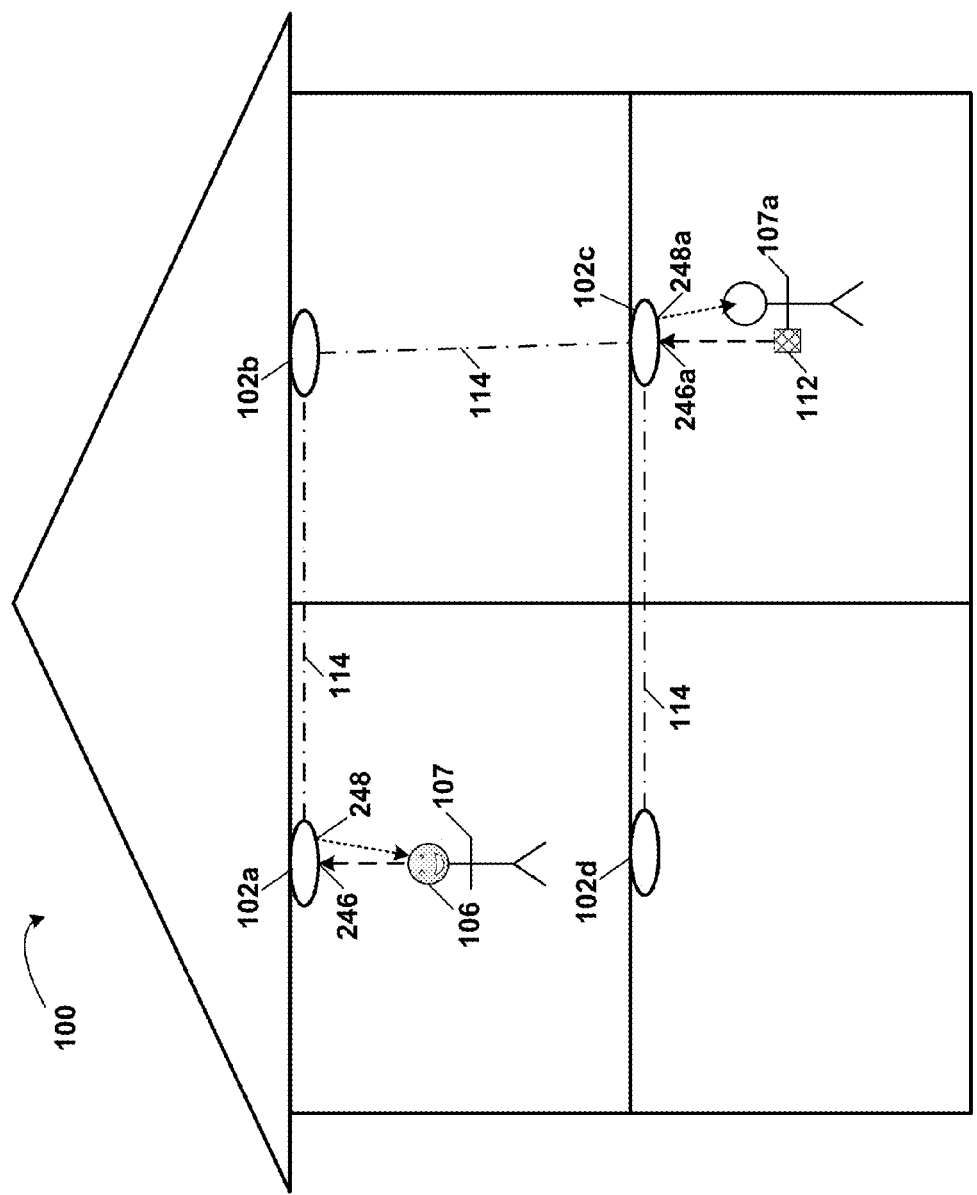
FIG. 1 illustrates a schematic elevational diagram of smoke detectors in a dwelling having image and/or facial gesturing recognition capabilities, according to specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, an apparatus may comprise smoke detection capabilities that may be easily tested using image recognition and/or facial gesturing without having to climb a ladder or chair to initiate the test, or be uncomfortably close to the smoke detection apparatus during initiation of the testing thereof. This smoke detection apparatus may replace existing smoke detector devices and/or be used in new construction for added safety and convenience of the occupants. It is contemplated and within the scope of this disclosure that carbon monoxide (CO), carbon dioxide ($CO_2$), explosive gas, hazardous gas and heat monitoring and alarm may also be provided and controlled according the teachings of this disclosure. Audio features may be provided in the smoke detector apparatus such as, but are not limited to, networked speakers for distribution of music, intercom, telephone, and/or doorbell annunciation. According to the building codes, smoke detector outlets must provide electrical power and a networked connection for simultaneous smoke alarm actuation in a building if the smoke alarm devices are not approved for wireless actuation. Having electrical power at the smoke detector outlet allows continuous use of electronic circuits in the smoke alarm device without having to frequently replace batteries and allows high power demand audio amplifiers to be used with a speaker(s) integral with or remote from the smoke detector device.

In addition, facial gesturing recognition may also be used to control other systems in a building, e.g., change temperature settings for heating ventilation and air conditioning (HVAC) systems, activating fresh air ventilation for improved indoor air quality (IAQ), arming and disarming entry alarms, answering a door bell and/or locking or unlocking a door, etc. Facial gesturing recognition may also be used to activate a silent alarm, e.g., 911 auto dial with live audio feed from the location of the smoke detector, in the event of home invasion and/or a hostage situation.

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic elevational diagram of smoke detectors in a dwelling having image and/or facial gesturing recognition capabilities, according to specific example embodiments of this disclosure. A dwelling, generally represented by the numeral 100, has a smoke detector 102 with image and/or facial gesturing recognition capabilities in each room thereof as required by building codes. Electrical power (not shown) is supplied to each smoke detector 102 and either a wired communications bus 114, e.g., Ethernet local area network (LAN) cabling, etc., or a code approved wireless communications link, e.g., WLAN, WiFi, Zigbee, etc., may be used to communicate smoke alarm actuation, as required by the building code, and couple audio, e.g., music, intercom voice paging, doorbell annunciation, etc., to an audio transducer, e.g., speaker, portion of the smoke detector 102.

The smoke detector 102 may further comprise an image sensor 246 and an image acquisition indicator 248. The smoke detector 102a may be adapted to recognize facial expressions, e.g., facial gesturing, that may initiate testing of the smoke alarm in the smoke detector 102. In addition, facial gesturing recognition may also be used for other purposes such as answering a door bell, a telephone, paging to other annunciation devices, e.g., other smoke detectors 102 and/or speakers throughout the dwelling, etc. A further use of facial gesturing may be actuation of a silent alarm during a robbery, home invasion and/or hostage situation. Different facial gestures (expressions) may be used to control activation of different functions. These facial gestures may be preprogrammed or learned by each of the smoke detectors 102, and may further be adapted for facial recognition of specific people before activation of an intended function. Facial recognition is more fully described in U.S. Pat. No. 8,457,367, entitled "Facial Recognition" by Michael Sipe, et al., and U.S. Pat. No. 7,295,687, entitled "Face Recognition Method Using Artificial Neural Network and Apparatus thereof" by Kee, et al.; both of which are incorporated by reference herein for all purposes.

A person 107 may stand or sit under a smoke detector 102a and look up, exposing his or her face 106 to the image sensor 246. When the image sensor 246 with its associated electronics (not shown) acquires an image of the face 106, the image acquisition indicator 248 may illuminate. Changes in facial expression (facial gesturing), e.g., blinking eyes, opening and closing mouth, wiggling ears, moving face back and forth, smiling, frowning, having one eye open and the other eye closed, etc., may then be used to actuate respective specific functions of the smoke detector 102a, e.g., initiate alarm test, answer door, answer telephone, general page, activate silent emergency 911 dial-up and audio telephone connection, etc. The person 107 may also be offset from being directly under the smoke detector 102a by aiming the image sensor in a particular direction and/or having an automatic area scan for acquiring an image of the face 106. Either way whenever the image acquisition indicator 248 illuminates, facial gesturing may then initiate a desired function activation.

The smoke detector 102c may be adapted to recognize specific images and/or patterns on a card 112 that may be used to initiate testing of the smoke alarm in the smoke detector 102. In addition, different images and/or patterns may be used for other purposes such as answering a door bell, a telephone, paging to other annunciation devices, e.g., other smoke detectors 102 and/or speakers throughout the dwelling, etc. These images and/or patterns may be preprogrammed or learned by each of the smoke detectors 102, and may further be adapted to recognize a coded unique image and/or pattern before activation of an intended function, e.g., unlocking a door or turning off a burglar alarm, etc. These images may be, for example but are not limited to, standard Universal Product Code (UPC) bar codes used on merchandise packages or Aztec Code images used on magazine pages or cell phone screens, etc. The image sensor 246a may be a standard UPC bar code or Aztec Code reader.

A person 107a may stand or sit under a smoke detector 102c and hold the card 112 with the pattern or image thereon facing the image sensor 246a. When the image sensor 246a with its associated electronics (not shown) acquires pattern or image on a face of the card 112, an acquisition indicator 248 may illuminate. Different patterns or images may be used to actuate respective specific functions of the smoke detector 102a, e.g., initiate alarm test, answer door, answer telephone, general page, activate silent emergency 911 dial-up and audio telephone connection, etc. The person 107a may also be offset from being directly under the smoke detector 102c by aiming the image sensor 246a in a particular direction and/or having an automatic area scan for acquiring the image or pattern on the face of the card 112. Either way whenever the acquisition indicator 248a illuminates, the image or pattern on the card 112 may then be used to initiated a desired function.

Figure 2:
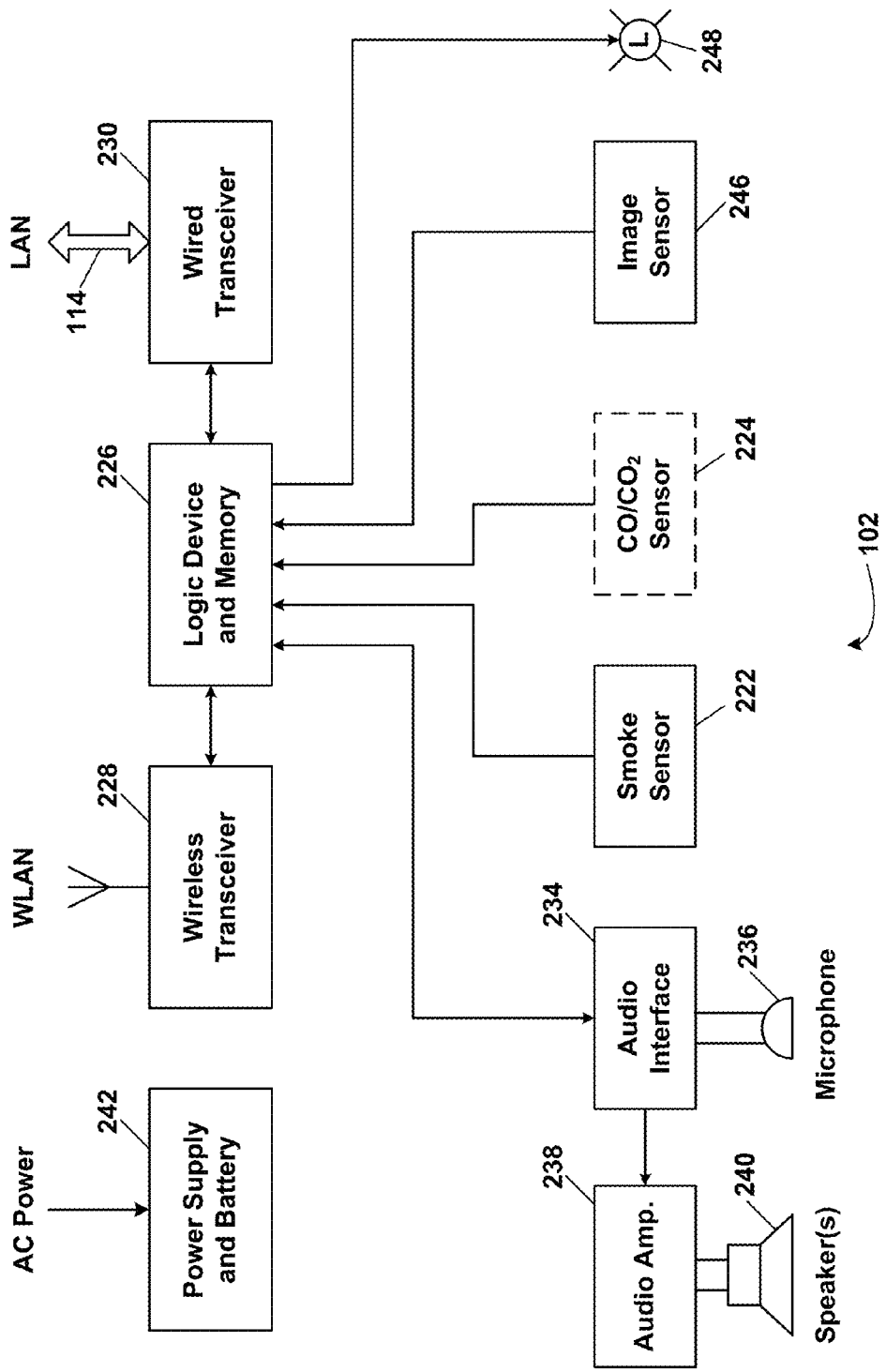
FIG. 2 illustrates a schematic block diagram of a smoke detector having image and/or facial gesturing recognition capabilities, according to specific example embodiments of this disclosure.

Referring to FIG. 2, depicted is a schematic block diagram of a smoke detector having image and/or facial gesturing recognition capabilities, according to specific example embodiments of this disclosure. A smoke detector having image and/or facial gesturing recognition capabilities, generally represented by the numeral 102, may comprise a smoke sensor 222, a carbon monoxide and/or carbon dioxide sensor (s) 224, a logic device 226 having a memory, a wireless transceiver 228 coupled to an antenna and/or a wired transceiver 230 coupled to a wired local area network (LAN), an audio interface 234, a microphone 236, an audible alarm generator, e.g., audio amplifier 238 and speaker(s) 240, an image sensor 246, an acquisition indicator 248, and a power supply and battery 242. The logic device 226 may be, for example but is not limited to, a microcontroller, a microprocessor, a digital signal processor (DSP), an application specific integrated circuit (ASIC), a field programmable gate array (FPGA), etc., and may have both digital and analog capabilities.

The smoke sensor 222 may be an ionization and/or optical smoke sensor, and the like. The sensor 224 may be a carbon monoxide and/or carbon dioxide sensor(s). The audio interface may allow for either half or full duplex operation with the microphone 236 and the audio amplifier 238/speaker 240. The image sensor 246 may be, for example but is not limited to, a charge-coupled device (CCD), a complementary metal-oxide semiconductor (CMOS) image sensor, etc. The acquisition indicator 248 may be a light emitting diode (LED). The power supply 242 with battery backup may be powered from the house alternating current (AC) power electrical branch circuits. The logic device 226 may comprise mixed signal (analog and digital) capabilities along with image processing and recognition, a program and storage memory (not shown). The wireless transceiver 228 and/or wired transceiver 230 may be part of or separate from the logic device 226. It is contemplated and within the scope of this disclosure that substitution for the logic device 226 may be an application specific integrated circuit (ASIC), a programmable logic array, a microprocessor, a digital signal processor (DSP), an image signal processor (ISP), etc. One having ordinary skill in integrated circuit design and having the benefit of this disclosure could come up with an effective design using mixed signal integrated circuit devices.

Testing of the smoke detector 102 may be initiated by the image sensor 246 in combination with an image processor, e.g., microprocessor 226, recognizing a facial gesture, image or pattern. Optionally the image acquisition indicator 248 may turn on steady upon proper positioning of the facial gesture, image or pattern; flash at a first rate upon recognition of the facial gesture, image or pattern; and flash at a second rate upon actuation of the associated function. After the function has completed then the image acquisition indicator 248 may turn off.

Activation of a smoke and/or carbon monoxide/dioxide alarm may be initiated by the logic device 226 sensing the outputs from the smoke sensor 223 and/or $CO/CO_2$ sensor 224. The logic device 226 may further signal other smoke detectors 102 of the detected smoke alarm to meet building code requirements via the wired transceiver 230 over a code approved wired communications line 114, e.g., Ethernet LAN, etc., and/or the wireless transceiver 228 over a code approved WLAN, WiFi, etc., signal. In addition, prerecorded evacuation messages may be stored in the memory of the logic device 226.

Music and/or voice content may be coupled to the logic device 226 via the wired transceiver 230, and/or the wireless transceiver 228. Simplex (one way) or duplex (two way) communications may be used between two or more smoke detectors 102, a speaker/microphone at a entrance door (doorbell interface), and/or a telephone line for speakerphone operation. Music and/or audio may be transmitted from the speaker(s) 240 to an occupant(s) of an area (room) proximate to the smoke detector 102 from the logic device 226 after being amplified by the audio amplifier 238. Audio (voice) from the occupant(s) of the area (room) proximate to the smoke detector 102 may be picked up by the microphone 236 and coupled into the logic device 226 via the audio interface 234. The audio interface 234 may also provide duplex operation of a voice conversation between two smoke detectors 102, a smoke detector 102 and a doorbell communications interface (not shown), and/or a telephone.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for detecting smoke and having pattern recognition capabilities, comprising:
    a logic device;
    a smoke sensor coupled to the logic device;
    an image sensor coupled to the logic device and configured to detect a pattern on a substrate;
    a communications interface coupled to the logic device;
    an audible alarm generator coupled to the logic device; and
    a power supply coupled to and powering the logic device, communications interface and the audible alarm generator;
    wherein when the smoke sensor detects smoke the logic device generates at least one smoke alarm tone through the audible alarm generator, and a smoke alarm signal through the communications interface; and
    wherein the logic device is configured to initiate a smoke alarm testing in response to detection of the pattern by the image sensor.

2. The apparatus according to claim 1, wherein the audible alarm generator comprises a speaker coupled to an audio amplifier that is coupled to the logic device.

3. The apparatus according to claim 1, wherein the communications interface is coupled to a wired communications bus.

4. The apparatus according to claim 3, wherein the wired communications bus is an Ethernet local area network.

5. The apparatus according to claim 1, wherein the communications interface is a wireless interface coupled to a radio frequency antenna.

6. The apparatus according to claim 5, wherein the communications interface is adapted to communicate with a wireless kcal area network (WLAN).

7. The apparatus according to claim 1, wherein the smoke sensor is an ionization chamber smoke sensor.

8. The apparatus according to claim 1, wherein the smoke sensor is an optical smoke sensor.

9. The apparatus according to claim 1, further comprising a microphone and an audio interface coupled to the logic device and providing an audio input.

10. The apparatus according to claim 1, further comprising a carbon monoxide sensor coupled to the logic device.

11. The apparatus according to claim 1, further comprising a carbon dioxide sensor coupled to the logic device.

12. The apparatus according to claim 1, further comprising an image acquisition indicator that indicates when an image is present in the image sensor.

13. The apparatus according to claim 1, wherein the logic device comprises a microcontroller.

14. The apparatus according to claim 1, wherein the logic device is selected from the group consisting of a microprocessor, a digital signal processor (DSP), an application specific integrated circuit (ASIC), and a held programmable gate array (FPGA).

15. The apparatus according to claim 1, wherein the pattern is a universal product code (UPC).

16. The apparatus according to claim 1, wherein the pattern is an Aztec code.

17. An apparatus for detecting smoke and having image recognition capabilities, comprising:
a logic device;
a smoke sensor coupled to the logic device;
an image sensor coupled to the logic device;
a communications interface coupled to the logic device;
an audible alarm generator coupled to the logic device; and
a power supply coupled to and powering the logic device, communications interface and the audible alarm generator;
wherein when the smoke sensor detects smoke the logic device generates at least one smoke alarm tone through the audible alarm generator, and a smoke alarm signal through the communications interface;
wherein recognition of an image initiates smoke alarm testing, and
wherein the image is a pattern on a substrate.

18. The apparatus according to claim 17, wherein the pattern is a universal product code (UPC).

19. The apparatus according to claim 17, wherein the pattern is an Aztec code.

20. The apparatus according to claim 17, wherein the smoke sensor is selected from the group consisting of an ionization chamber smoke sensor and an optical smoke sensor.

21. The apparatus according to claim 17, further comprising a carbon monoxide sensor coupled to the logic device.

22. The apparatus according to claim 17, wherein the logic device comprises a microcontroller.

23. The apparatus according to claim 17, wherein the logic device is selected from the group consisting of a microprocessor, a digital signal processor (DSP), an application specific integrated circuit (ASIC), and a field programmable gate array (FPGA).

* * * * *

UNITED STATES PATENT AND TRADEMARK OFFICE
CERTIFICATE OF CORRECTION

PATENT NO.        : 9,159,218 B2
APPLICATION NO.   : 14/029757
DATED             : October 13, 2015
INVENTOR(S)       : Richard Simoncic et al.

It is certified that error appears in the above-identified patent and that said Letters Patent is hereby corrected as shown below:

Column 7,
Claims, Claim 14, line 26, ". . .and a held programmable gate. . ." ---Change to---
". . . and a field programmable gate. . ."

Signed and Sealed this
Fifteenth Day of March, 2016

Michelle K. Lee
*Director of the United States Patent and Trademark Office*